United States Patent
Jung

(10) Patent No.: US 9,431,799 B2
(45) Date of Patent: Aug. 30, 2016

(54) STRUCTURE OF THREE-PHASE INTEGRATED BUS IN GAS INSULATED SWITCHGEAR

(71) Applicant: LSIS CO., LTD., Anyang-si, Gyeonggi-do (KR)

(72) Inventor: Hae Eun Jung, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 163 days.

(21) Appl. No.: 14/044,409

(22) Filed: Oct. 2, 2013

(65) Prior Publication Data

US 2014/0118885 A1    May 1, 2014

(30) Foreign Application Priority Data

Nov. 1, 2012   (KR) ............... 20-2012-0009998 U

(51) Int. Cl.
  *H02B 1/20*      (2006.01)
  *H02B 7/01*      (2006.01)
  *H02B 13/035*    (2006.01)
  *H02G 5/06*      (2006.01)

(52) U.S. Cl.
  CPC .. *H02B 7/01* (2013.01); *H02B 1/20* (2013.01); *H02B 13/0352* (2013.01); *H02G 5/063* (2013.01)

(58) Field of Classification Search
  None
  See application file for complete search history.

(56) References Cited

U.S. PATENT DOCUMENTS

| | | | |
|---|---|---|---|
| 4,331,847 A * | 5/1982 | Cretin .................... 200/48 R |
| 4,458,099 A * | 7/1984 | Takeuti et al. .......... 174/27 |
| 4,535,383 A * | 8/1985 | Yamaoka et al. ........ 361/612 |
| 5,177,664 A * | 1/1993 | Tsuchiya et al. ........ 361/612 |
| 6,509,522 B1 * | 1/2003 | Okabe et al. ............ 174/28 |
| 6,515,247 B1 * | 2/2003 | Tsuzura et al. .......... 218/43 |
| 6,664,493 B2 * | 12/2003 | Yamada et al. .......... 218/43 |
| 8,456,807 B2 * | 6/2013 | Tallam et al. ........... 361/637 |

FOREIGN PATENT DOCUMENTS

| CN | 1176512 | 3/1998 |
|---|---|---|
| EP | 0036580 | 9/1981 |

(Continued)

OTHER PUBLICATIONS

European Patent Office Application Serial No. 13188142.7, Search Report dated Feb. 10, 2014, 7 pages.

(Continued)

*Primary Examiner* — Courtney Smith
(74) *Attorney, Agent, or Firm* — Lee, Hong, Degerman, Kang & Waimey; Jonathan Kang; Richard Salfelder

(57) ABSTRACT

The present disclosure relates to a gas insulated switchgear (GIS), and more particularly, a structure of a bus in a GIS. A structure of a three-phase integrated bus in a GIS, in a bus of a gas insulated switchgear comprising an enclosure, three phase conductors inserted in the enclosure, and spacers coupled to both sides of the enclosure to fix the three phase conductors, is characterized in that the three phase conductors are arranged in a shape of inverted triangle, wherein a conductor located at a lower side, of the three phase conductors, is formed in a shape of straight pipe, and has a branch bus upwardly extending from its middle portion, and wherein each of two conductors located at an upper end of the inverted triangle, of the three phase conductors, has both side portions formed in a shape of straight pipe and a middle portion outwardly curved.

3 Claims, 4 Drawing Sheets

(56) References Cited

FOREIGN PATENT DOCUMENTS

| | | |
|---|---|---|
| EP | 0127006 | 12/1984 |
| JP | 5673125 | 6/1981 |
| JP | 1169581 A | 3/1999 |

OTHER PUBLICATIONS

Korean Intellectual Property Office Application Serial No. 20-2012-0009998, Office Action dated Sep. 17, 2013, 3 pages.
The State Intellectual Property Office of the People's Republic of China Application Serial No. 201310560379.7, Office Action dated Aug. 26, 2015, 5 pages.

\* cited by examiner

STRUCTURE OF THREE-PHASE INTEGRATED BUS IN GAS INSULATED SWITCHGEAR

CROSS-REFERENCE TO RELATED APPLICATION

Pursuant to 35 U.S.C. §119(a), this application claims the benefit of earlier filing date and right of priority to Korean Application No. 20-2012-0009998, filed on Nov. 1, 2012, the contents of which is incorporated by reference herein in its entirety.

BACKGROUND OF THE DISCLOSURE

1. Field of the Disclosure

This specification relates to a gas insulated switchgear (GIS), and particularly, to a structure of a three-phase integrated bus in a GIS.

2. Background of the Disclosure

A gas insulated switchgear (GIS) is an electric device, which is installed in a circuit between a power supply side and a load side of an electric power system, to protect the electric power system and a load device by safely cutting off a current when the circuit is artificially switched on or off in a normal current-flowing state or when a fault current such as ground circuit or short-circuit is generated on the circuit. The GIS generally includes a bushing unit for receiving power from a high voltage power supply, a line disconnector switch/earthing switch (DS/ES), a gas circuit breaker, a bus DS/ES, a driving unit, a controller and the like.

The GIS occupies a great space. Therefore, one of important design requirements for the GIS is that each component is compactly disposed, exhibits a necessary performance, and is suitable for conditions.

From this perspective, a bus used in the GIS has to meet conflictive design conditions, namely, ensuring of an insulating performance and a compact construction.

Specifically, unlike a three-phase separated bus, a three-phase integrated bus has three phase conductors coexisting within one enclosure. Therefore, the ensuring of the insulating performance and the compact construction are more important design factors in the three-phase integrated bus.

As basic types of buses, FIG. 1 shows a parallel type bus and FIG. 2 shows a straight pipe type bus. A structure of a three-phase integrated bus is shown in FIG. 1. Referring to FIG. 1, spacers 5 are coupled to both sides of an enclosure 1 with a cylindrical shape, three phase conductors 2, 3 and 4 are fixed to the spacers 5 at positions of three apexes of an inverted triangle, respectively. Each of the three phase conductors 2, 3 and 4 has both sides bent. Here, middle portions of the three phase conductors 2, 3 and 4 are disposed in parallel to one another, and a branch bus is upwardly led out (upwardly extending) from a part of each of the three phase conductors 2, 3 and 4. In order to meet minimum insulating distances between the adjacent conductors and between each conductor and the enclosure, the enclosure has to be considerably increased in size.

On the other hand, the straight pipe type bus shown in FIG. 2 includes three phase conductors, 2', 3' and 4' formed in a shape of straight pipe within a cylindrical enclosure 1' and disposed in parallel into a form of an inverted triangle. Here, the second phase conductor 3' and the third phase conductor 4' may be orthogonal to a branch bus of the first phase conductor 2' at their middle portions. To ensure insulating distances among them, each phase conductor has to be arranged with a sufficient distance. This shows that a considerable space even up to both sides of the three phase conductors 2', 3' and 4' is consumed.

U.S. Pat. No. 6,509,522, as an exemplary prior art having the straight pipe type conductors and the cylindrical enclosure, has introduced "Three phase Integrated Gas Insulated Bus." This invention provides a bus structure that each phase has two outlets branched in a vertical direction and in a horizontal direction. However, the three phase conductors are basically designed in a shape of straight pipe to be arranged in parallel in a triangular form, and the enclosure has the cylindrical shape.

Meanwhile, referring to Gas Insulated Bus and GIS published in Korean Patent Application Laid-Open Publication No. 1999-023397A, for a compact construction of a bus, three phase conductors are formed to be convex along a circumferential direction. However, such shape is difficult to be produced and the enclosure still has the cylindrical shape. Consequently, it is substantially difficult to expect a compact arrangement effect of the three phase conductors.

SUMMARY OF THE DISCLOSURE

Therefore, to overcome those drawbacks of the related art, an aspect of the detailed description is to provide a structure of a three-phase integrated bus in a gas insulated switchgear (GIS), capable of ensuring an overall compact construction and an insulating performance, in such a manner that a path of a bus is formed to have both sides linear (straight) and a middle portion curved, and an enclosure is formed such that both side portions have a diameter shorter than that of a middle portion.

To achieve these and other advantages and in accordance with the purpose of this specification, as embodied and broadly described herein, there is provided a structure of a three-phase integrated bus in a gas insulated switchgear (GIS), in a bus of a gas insulated switchgear comprising an enclosure, three phase conductors inserted in the enclosure, and spacers coupled to both sides of the enclosure to fix the three phase conductors, wherein the three phase conductors may be arranged in a shape of inverted triangle. Here, a conductor located at a lower end, of the three phase conductors, may be formed in a shape of straight pipe, and have a branch bus upwardly led out from its middle portion. Each of two conductors located at an upper end of the inverted triangle, of the three phase conductors, may have both side portions formed in a shape of straight pipe and a middle portion outwardly curved.

The enclosure may be formed in a cylindrical shape. Here, each of a left side portion and a right side portion of the enclosure may have a longitudinal section with a diameter shorter than that of a longitudinal section of a middle portion of the enclosure.

The middle portion of the enclosure may have a circular or oval cross section, and be outwardly curved to be convex from the cylindrical body of the enclosure.

In a structure of a three-phase integrated bus in a gas insulated switchgear (GIS) according to one exemplary embodiment, both side portions of a bus may be formed in a straight form, and a middle portion thereof may be curved. Also, an enclosure may be formed such that both side portions have a shorter diameter than a middle portion. This may result in implementation of a compact structure of the enclosure.

Also, an insulating performance required for the bus can be ensured with implementing the compact structure.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. The exemplary embodiments are merely illustrative to facilitate those skilled in the art to which the present disclosure belongs to practice this invention and are not to be construed as limiting the present disclosure.

A three-phase integrated bus in a gas insulated switchgear (GIS) according to one exemplary embodiment of the present disclosure may include an enclosure 10, three phase conductors 30, 40 and 50 inserted into the enclosure 10, and spacers for installing the three phase conductors 30, 40 and 50.

Figure 2:
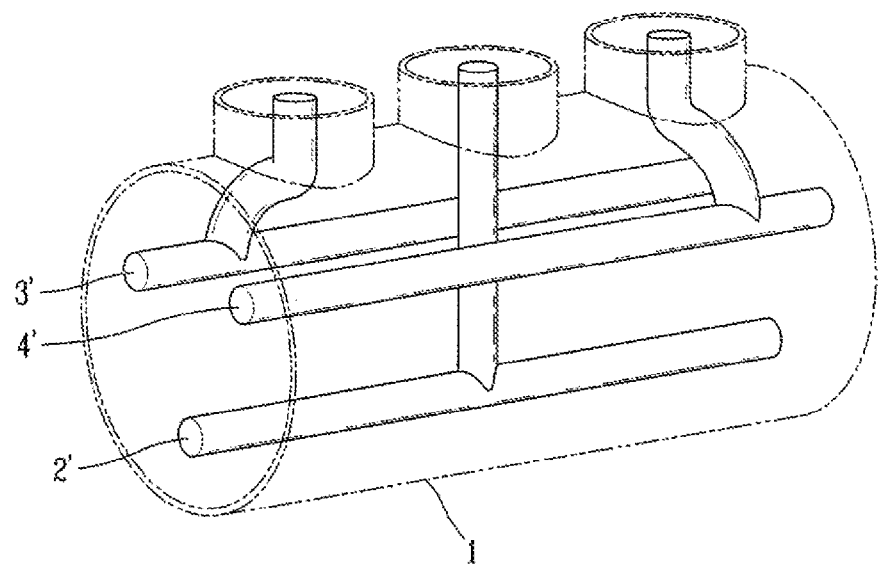
FIG. 2 is a perspective view of a structure of a straight pipe type bus according to the related art.
Figure 3:
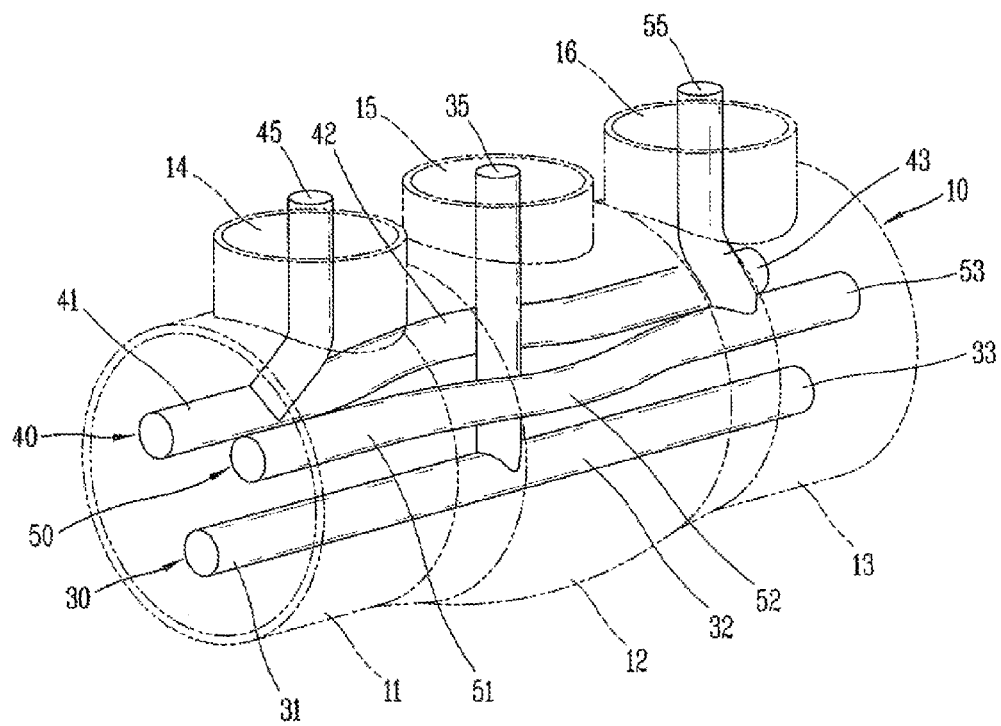
FIG. 3 is a perspective view of a structure of a bus in accordance with one exemplary embodiment of the present disclosure.
Figure 4:
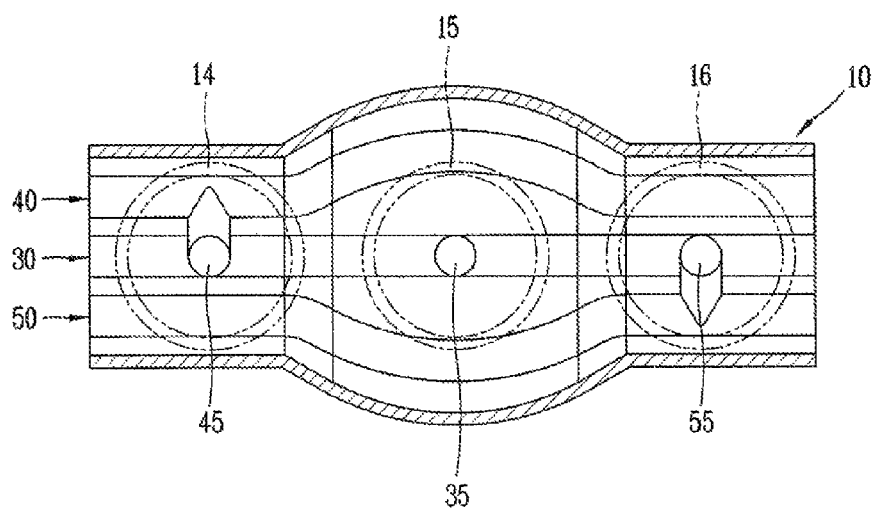
FIG. 4 is a planar view of FIG. 2.
Figure 5:
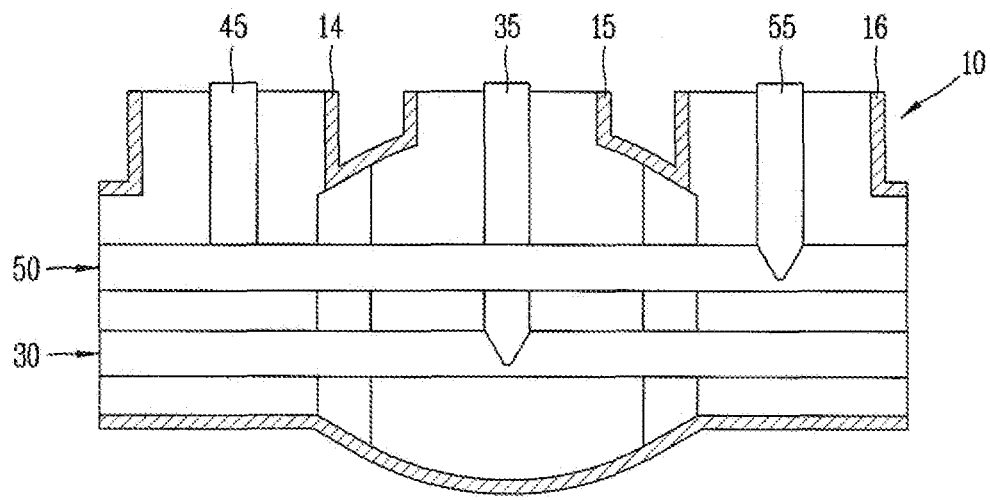
FIG. 5 is a front view of FIG. 2.
Figure 6:
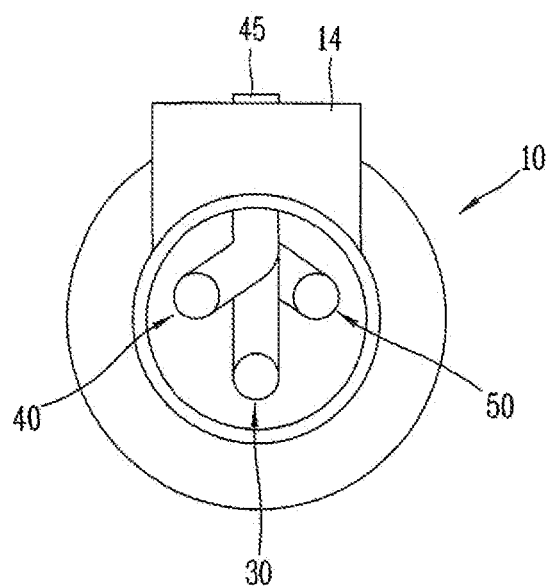
FIG. 6 is a side view of FIG. 2.

FIG. 3 is a perspective view of a structure of a bus in accordance with one exemplary embodiment of the present disclosure, FIG. 4 is a planar view of FIG. 2, FIG. 5 is a front view of FIG. 2, and FIG. 6 is a side view of FIG. 2.

Hereinafter, description will be given of a structure of a three-phase integrated bus in a GIS according to one exemplary embodiment with reference to FIGS. 3 to 6.

The enclosure 10 may generally be formed in a cylindrical shape, and preferably be made of a material with high corrosion resistance, such as stainless steel.

A middle portion 12 of a cylindrical body of the enclosure 10 may have a cross section in a circular or oval shape. The middle portion 12 may be outwardly curved to be convex from the cylindrical body. Although the longitudinal section of the middle portion 12 has the oval shape, a transverse section of the middle portion 12 may have a circular shape.

Unlike the middle portion 12 of the enclosure 10, each of a left side portion and a right side portion 13 of the enclosure 10 may have a transverse section with a diameter shorter than that of the middle portion 12. Here, center lines of the left side portion 11 and the right side portion 13 may preferably be same with a center line of the middle portion 12.

Outlet pipes 14, 15 and 16 may upwardly extend from upper ends of the left side portion 11, the right side portion 13 and the middle portion 12, respectively, so as to form outlets. Boundaries between each of the left side portion 11 and the right side portion 13 of the body and the middle portion 12 and connected portions of the outlet pipes 14, 15 and 16 to the body may be processed to be smooth. The connected portions may preferably be welded or sealed after being coupled by screws, so as to maintain a sealed state. Also, the left side portion 11, the right side portion 13 and the middle portion 12 of the enclosure 10 may be integrally formed together.

Although not shown, spacers in a form of flange may be coupled to both side surfaces of the enclosure 10.

Viewing the three phase conductors 30, 40 and 50 from a side surface, they are arranged on apexes of an inverted triangle. For the sake of explanation, a conductor located at a lower side is referred to as a first phase conductor 30, and the others are sequentially referred to as a second phase conductor 40 and a third phase conductor 40 in a clockwise direction.

The first phase conductor 30 may basically have a shape similar to a laid alphabet 'T.' Both side portions 31 and 33 of the first phase conductor 30 may be fixed by the spacers coupled to the side surfaces of the enclosure 10. In some cases, the side portions 31 and 33 may be supported by supporters formed within the enclosure 10.

A branch bus 35 of the first phase conductor 30 may extend upwardly to be exposed to the outside through the outlet pipe 15 of the enclosure 10. The branch bus 35 of the first phase conductor 30 may upwardly extend in a perpendicular direction from a middle portion 32 of the first phase conductor 30.

The second phase conductor 40 may be formed basically the same as the first phase conductor 30, but its middle portion 42 may be outwardly curved to avoid interference with the branch bus 35 of the first phase conductor 30. Here, the middle portion 42 of the second phase conductor 40 and the branch bus 35 of the first phase conductor 30 should be spaced far enough to satisfy a minimum standard for ensuring an insulating performance.

A branch bus 45 of the second phase conductor 40 may be formed on a left side portion 41 of the second phase conductor 40. The branch bus 45 of the second phase conductor 40 may extend toward a center line of the outlet pipe 14, then curved at the center line, and upwardly extend in a perpendicular direction.

The third phase conductor 50 may be symmetrical to the second phase conductor 40.

A middle portion 52 of the third phase conductor 50 may be outwardly curved, and designed to maintain a sufficient insulating distance from the branch bus 35 of he first phase conductor 30.

A branch bus 55 of the third phase conductor 50 may be formed on a right side portion 53 of the third phase conductor 50. The branch bus 55 may extend toward a center line of the outlet pipe 16 of the enclosure 10, then be curved at the center line, and upwardly extend in a perpendicular direction.

Figure 1:
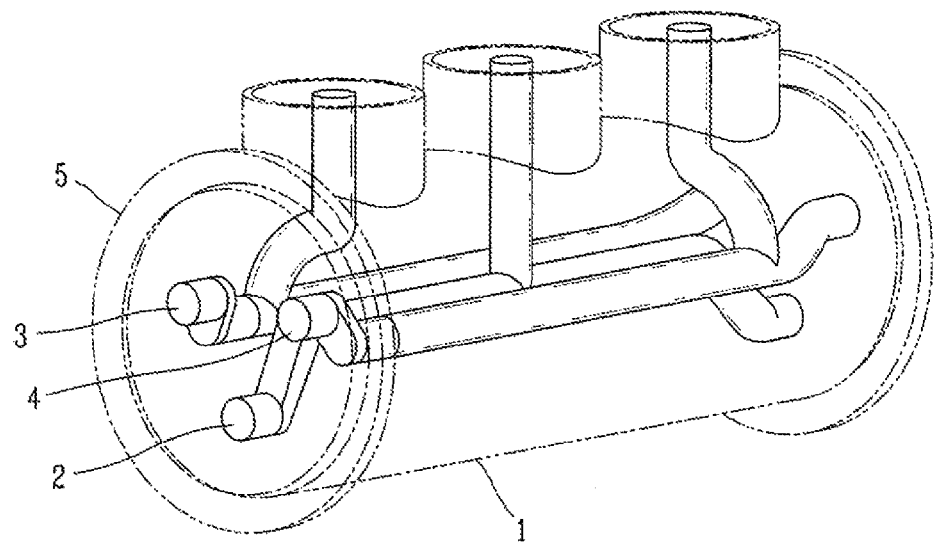
FIG. 1 is a perspective view of a structure of a parallel type bus according to the related art.

In order to examine an insulating performance of the three-phase integrated bus in the GIS according to the one exemplary embodiment of the present disclosure, an electric field analysis has been executed for three types of buses, and the results are shown as follows. Here, A indicates the analysis results for the related art parallel type bus structure shown in FIG. 1, B indicates the analysis results for the related art straight pipe type bus structure shown in FIG. 2, and C indicates the analysis results for the bus structure according to the one exemplary embodiment of the present disclosure. The bus structure according to the one exemplary embodiment has undergone two types of electric field analyses.

| Items | A | B | C | |
|---|---|---|---|---|
| Outer diameter of spacer (mm) | 765 | 700 | 650 | 700 |
| Inner diameter of enclosure (mm) | 620 | 570 | 496/650 | 546/665 |
| phase-earth minimum distance (mm) | 107.7 | 110 | 107 | 128 |
| phase-phase minimum distance (mm) | 92.5 | 68 | 96 | 102.5 |
| phase-earth E-field (V/m) | 22215 | 21530 | 22787 | 20897 |
| phase-phase E-field (V/m) | 19110 | 23662 | 20500 | 17786 |

According to those analysis results, it can be noticed that the bus structure according to the one exemplary embodiment exhibits a longer phase-earth minimum distance or phase-phase minimum distance, a more compact configuration of the enclosure, and a similar or higher insulating performance to or than the related art bus structures.

Hereinafter, description will be given of another exemplary embodiment of the present disclosure.

Figure 7:
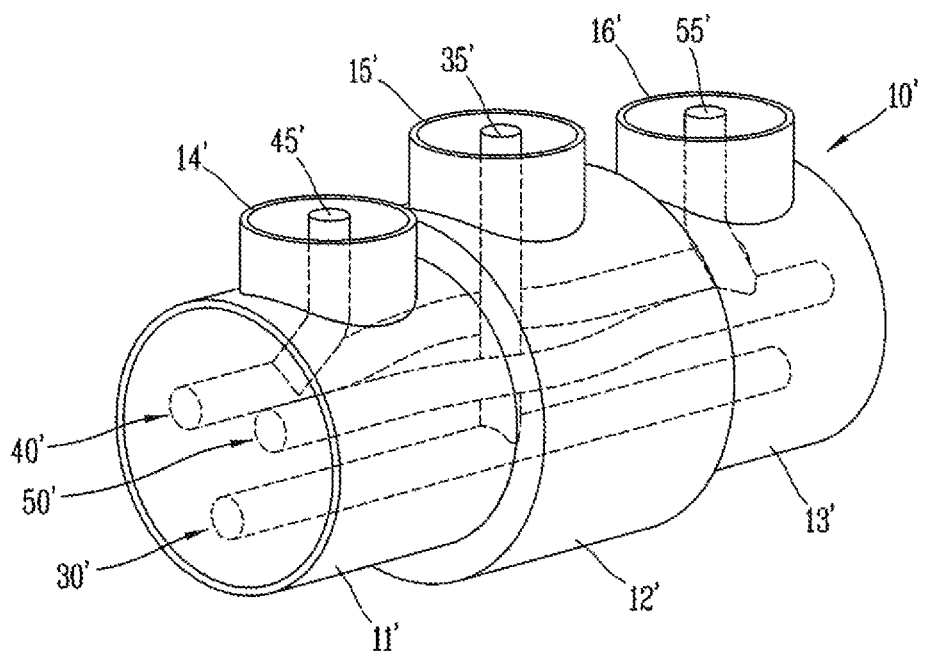
FIG. 7 is a perspective view of a structure of a bus in accordance with another exemplary embodiment of the present disclosure.

Referring to FIG. 7, a bus according to this another exemplary embodiment mostly has the same structure as that of the foregoing exemplary embodiment, excluding that a middle portion 12' of an enclosure 10' is formed in a cylindrical shape, similar to a left side portion 11' and a right side portion 13' connected to the middle portion 12', so as to form stepped portions. The connected portions where the middle portion 12' is connected to the left side portion 11' and the right side portion 13' may be coupled by screws or welded so as to maintain a sealed state. Such simplified structure may be fabricated more easily without a great difference from the foregoing exemplary embodiment in the aspect of the analysis results.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A structure of a three-phase integrated bus in a gas insulated switchgear (GIS), the structure comprising an enclosure, three phase conductors inserted in the enclosure, and spacers coupled to both sides of the enclosure to fix the three phase conductors,
   wherein the three phase conductors are arranged in a shape of inverted triangle with respect to a specific orientation,
   wherein one of the three phase conductors is entirely located in a lower position than the other two of the three phase conductors with respect to the same specific orientation,
   wherein the one of the three phase conductors that is entirely located in the lower position is formed in a shape of straight pipe, and has a branch bus upwardly led out from its middle portion with respect to the same specific orientation, and
   wherein each of two conductors located at an upper end of the inverted triangle, of the three phase conductors, has both side portions formed in a shape of straight pipe and a middle portion outwardly curved in opposite directions from the branch bus with respect to the same specific orientation such that the branch bus extends between the two conductors.

2. The structure of claim 1, wherein the enclosure is formed in a cylindrical shape, wherein each of a left side portion and a right side portion of the enclosure has a transverse section with a diameter shorter than that of a transverse section of a middle portion of the enclosure with respect to the same specific orientation.

3. The structure of claim 1, wherein the middle portion of the enclosure has a circular or oval cross section, and is outwardly curved to be convex from the cylindrical body of the enclosure with respect to the same specific orientation.

* * * * *